United States Patent [19]

Sakakibara et al.

[11] Patent Number: 4,944,330
[45] Date of Patent: Jul. 31, 1990

[54] DISK TYPE VALVE

[75] Inventors: Kohei Sakakibara; Kanetaro Masuoka; Toshio Fukushima, all of Tokoname, Japan

[73] Assignee: Inax Corporation, Tokoname, Japan

[21] Appl. No.: 376,997

[22] Filed: Jul. 7, 1989

[30] Foreign Application Priority Data

Jul. 22, 1988 [JP] Japan .................................. 63-182935
May 26, 1989 [JP] Japan .................................... 1-61451

[51] Int. Cl.$^5$ ............................................. F16K 3/08
[52] U.S. Cl. .............................. 137/625.31; 137/454.2
[58] Field of Search ............ 137/625.31, 454.5, 454.6, 137/454.2; 251/208

[56] References Cited

U.S. PATENT DOCUMENTS

| | | | |
|---|---|---|---|
| 1,910,753 | 5/1933 | Colvin | 137/625.31 X |
| 2,923,318 | 2/1960 | Monson | 137/625.31 X |
| 3,465,782 | 9/1969 | Parkison et al. | 137/625.31 X |
| 3,834,416 | 9/1974 | Parkison | 137/625.31 X |

FOREIGN PATENT DOCUMENTS 1454755  8/1966  France .
60-222671 11/1985  Japan .

OTHER DOCUMENTS

European Search Report EP 89 30 7299

Primary Examiner—Arnold Rosenthal
Attorney, Agent, or Firm—Kanesaka and Takeuchi

[57] ABSTRACT

A disk type valve which is arranged such that a pair of fixed and movable disks which are superposed one upon the other are disposed in a cylindrical valve casing in such a manner that the planes of the disks are perpendicular to the axis of the valve casing, these disks being provided with notches or openings for passing water, and the movable disk being engaged with the distal end of a spindle which is inserted into the valve casing from one end thereof in parallel to the axis of the valve casing, wherein the movable disk is disposed at the other end of the valve casing, and the spindle is passed through an insertion portion provided in the fixed disk and engaged with the movable disk.

6 Claims, 8 Drawing Sheets

FIG. 9
FIG. 10
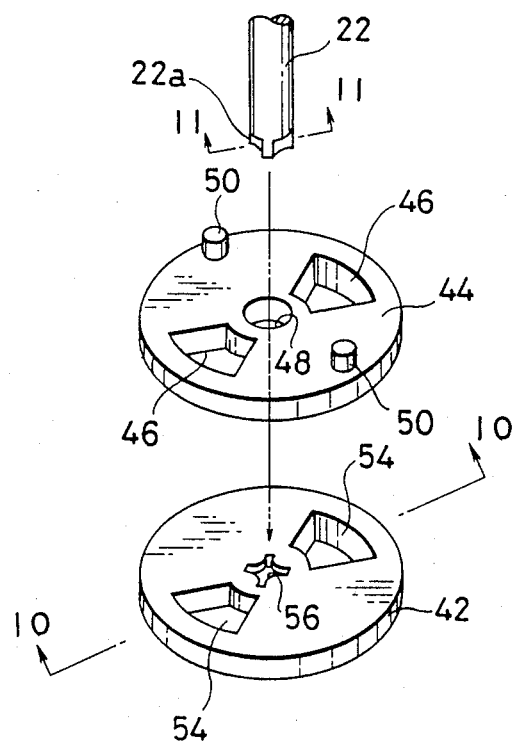
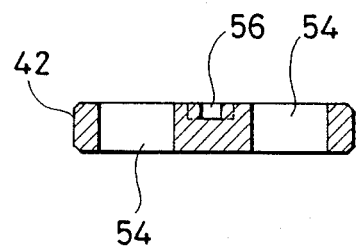
FIG. 11
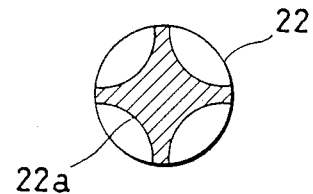

DISK TYPE VALVE

BACKGROUND OF THE INVENTION

1. Field of the Invention

The present invention relates to a disk type valve for use in valve means, for example, a water valve, a mixing valve, a flow path switching valve of an anus washer provided in a toilet, etc. More particularly, the present invention pertains to a disk type valve having disk-shaped valve bodies (disks) made of a ceramic material.

2. Description of the Related Art

Valve means (e.g., water valves, mixing valves, etc.) which have disk type valves serving as flow control valves have heretofore been widely employed. The disk type valve is generally arranged such that a pair of fixed and movable disks which is superposed one upon the other is disposed in a cylindrical valve casing in such a manner that the planes of the disks are perpendicular to the axis of the valve casing, these disks being provided with notches or openings for passing water.

The conventional disk type valve will be explained below with reference to FIGS. 2 to 5.

The reference numeral 12 denotes a cylindrical valve casing of a disk type valve 10. The central portion of the valve casing 12 is provided with a slit-shaped opening (hereinafter referred to as "slit") 14 from which a fluid, for example, water, hot water, mixed water, etc. (hereinafter referred to as "water") flows out as shown by the arrow. The valve casing 12 is installed in such a manner that one axial end portion A thereof projects outside from the body of the valve device (not shown). A movable disk (disk-shaped valve body) 16, shown in FIGS. 3 to 5, which is made of a ceramic material, for example, alumina (aluminium oxide), is fitted in the other axial end portion B of the valve casing 12 in such a manner that the disk 16 is movable within the plane thereof.

The movable disk 16 is provided with two substantially sectorial openings 18 for passing water. In addition, an elongate groove 24 through which a spindle 22 is connected to the movable disk 16 is formed in the reverse surface of the disk 16 with respect to the surface thereof which is in sliding contact with a fixed disk 30 (described later). The movable disk 16 is retained by means of an inward flange (retaining portion) 26 which is formed inside the valve casing 12, as shown in FIG. 2. It should be noted that the reference numeral 28 denotes a slipwasher which is interposed between the inward flange 26 and the movable disk 16 to enable the disk 16 to rotate smoothly.

A fixed disk 30 is installed inside the end portion B of the valve casing 12 in such a manner that the movable and fixed disks 16 and 30 are superposed one upon the other and the former is slidable on the latter, the fixed disk 30 being made of the same ceramic material as that used to form the movable disk 16 and having the same configuration as that of the disk 16. The reference numeral 32 denotes an elongate groove formed in the fixed disk 30. It should be noted that, although in the prior art shown in FIGS. 2 to 5 the disks 16 and 30 are provided with sectorial openings, there are cases where sectorial notches are provided therein.

An elongate leaf spring 34 is fitted in the elongate groove 32 provided in the fixed disk 30 in such a state that the central portion of the leaf spring 34 is arcuated. Two end portions of the leaf spring 34 are fitted into respective small holes 36 which are provided in the inner peripheral surface of the end portion B of the valve casing 12, thereby retaining the leaf spring 34. Accordingly, the fixed disk 30 is pressed against the movable disk 16 with an appropriate pressure applied by the biasing force from the leaf spring 34. It should be noted that the fixed disk 30 is prevented from rotating by the leaf spring 34.

The distal end portion (in the shape of a flat plate) of a spindle 22 is fitted in the elongate groove 24 provided in the movable disk 16. The central portion of the spindle 22 is rotatably supported by a holder portion 12a formed at the end A of the valve casing 12. Serrations are provided in the outer end portion of the spindle 22 so that a handle is engageable with the spindle 22 through the serrations.

It should be noted that the spindle 22 has a stop pin 38 radially projecting therefrom. The stop pin 38 is received in a slit 40 provided in the valve casing 12. The slit 40 is provided so as to extend through about 90° with respect to the axis of the valve casing 12. Thus, the spindle 22 is rotatable about it own axis within the range of about 90°.

In addition, a collar 22T is provided on the spindle 22, the collar 22T being in sliding contact with the holder portion 12a.

In the disk type valve 10 arranged as stated above, as the spindle 22 is turned, the movable disk 16 rotates, causing a change in the degree at which the openings 18 in the movable disk 16 overlap those in the fixed disk 30, and thus enabling switching of the valve device between the open position and the closed postion and also permitting control of the flow rate. In this case, water flows into the disk type valve 10 from the end B of the valve casing 12, passes through the fixed and movable disks 30 and 16 in the mentioned order and flows out from the slit 14.

In the above-described conventional disk type valve 10, the fixed disk 30 is pressed against the movable disk 16 by means of the leaf spring 34, and pressure of the water flowing into the disk type valve 10 also acts in a direction to which the fixed disk 30 is pressed against the movable disk 16. Therefore, the movable disk 16 is slid in a state wherein it is pressed against the fixed disk 30 and the slip washer 28 with a pressure which is the sum of the biasing force from the leaf spring 34 and the water pressure, thus causing considerably high sliding resistance. The collar 22T of the spindle 22 may also be pressed against the holder portion 12a by the combination of the water pressure and the leaf spring pressure, which also causes high sliding resistance.

Under these circumstances, there has heretofore been a fear that the spindle 22 cannot be rotated, that is, the handle cannot be turned, unless strong torque is applied thereto, particularly when the water pressure is high or when the movable disk 16 cannot slide smoothly because the slip washer 28 has deteriorated.

SUMMARY OF THE INVENTION

It is an object of the invention to provide a disk type valve, the handle of which can be operated lightly and smoothly at any time.

The present invention relates to a disk type valve which is arranged such that a pair of fixed and movable disks which is superposed one upon the other is disposed in a cylindrical valve casing in such a manner that the planes of the disks are perpendicular to the axis of the valve casing, these disks being provided with notches or openings for passing water, and the movable disk being engaged with the distal end of a spindle which is inserted into the valve casing from one end thereof in parallel to the axis of the valve casing.

In one embodiment of the present invention, the movable disk is disposed at the other end of the valve casing, and the spindle is passed through an insertion portion provided in the fixed disk and engaged with the movable disk.

In another embodiment of the present invention, the disk type valve is arranged such that the spindle is rotated through 90° about its own axis to open or close the valve, the distal end of the spindle having a square or cross-shaped configuration in a section perpendicular to the axis of the spindle.

As the spindle is rotated, the openings or notches respectively provided in the two disks overlap each other or become offset from each other, thereby switching the valve to the open position or the closed position.

In the present invention, the movable disk slides while being pressed against the fixed disk by the water pressure alone. Therefore, the friction acting on the movable disk is lowered and the torque required to rotate the movable disk is minimized.

Accordingly, in a valve device or a flow path switching valve that employs the disk type valve of the present invention, the handle can be operated lightly and smoothly at all times and such a valve device can be used comfortably.

In the disk type valve of the present invention, the engaging relation between the spindle and the movable disk can be changed in an angle unit of 90° with respect to the axis of the spindle. Accordingly, it is possible to select either an operating mode in which the valve position is switched over from the open position to the closed position by turning the handle clockwise or another operating mode in which the handle is turned counterclockwise to switch the valve position from the open position to the closed position.

BRIEF DESCRIPTION OF THE DRAWINGS

FIG. 9 is an exploded perspective view showing the arrangement of an essential part of another embodiment of the present invention;

FIG. 10 is a sectional view taken along the line X—X of FIG. 9;

FIG. 11 is an enlarged sectional view taken along the line XI—XI of FIG. 9;

DESCRIPTION OF THE PREFERRED EMBODIMENTS

Preferred embodiments of the present invention will be described below with reference to the accompanying drawings.

Figure 1:
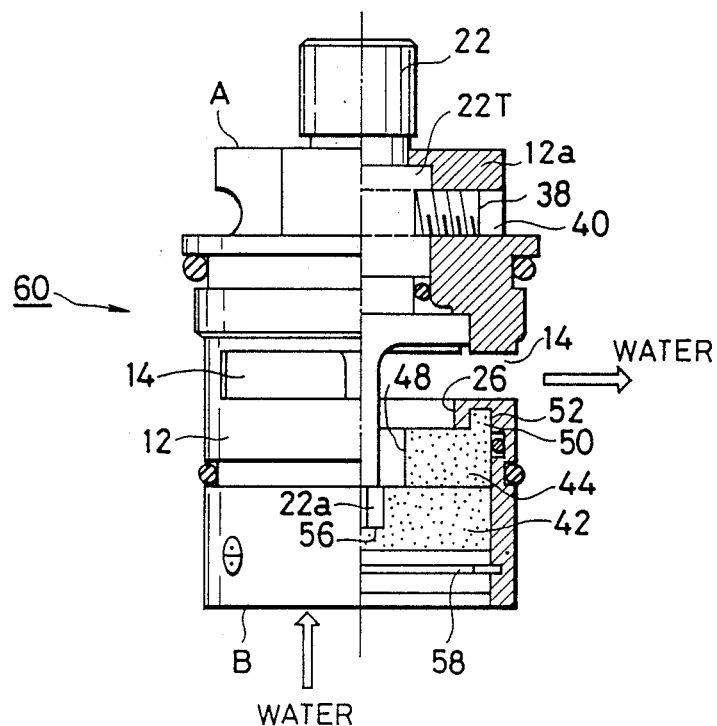
FIG. 1 is a sectional view of one embodiment of the disk type valve according to the present invention.
Figure 2:
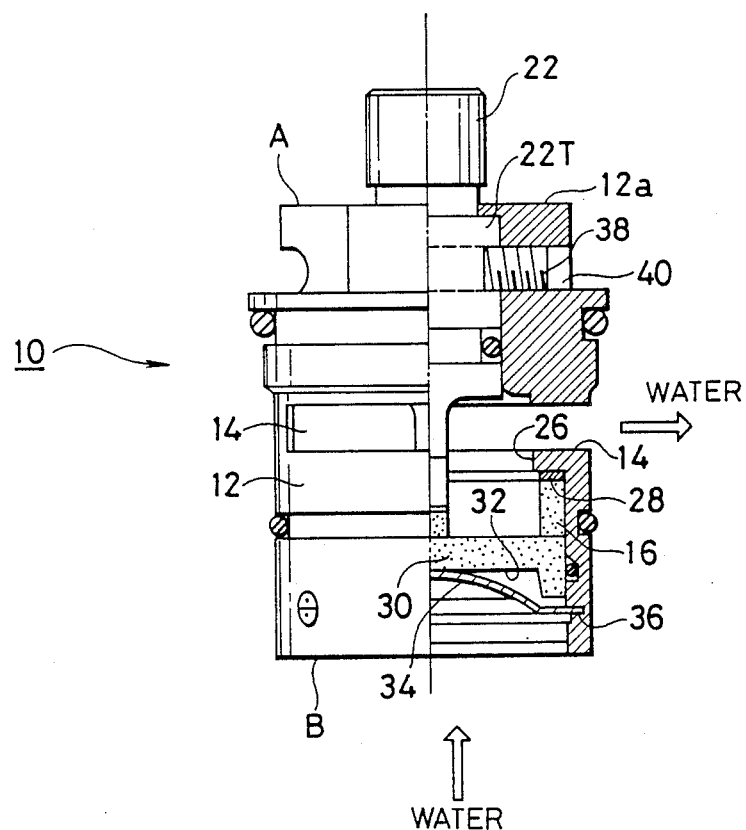
FIG. 2 is a sectional view of a conventional disk type valve.
Figure 3:
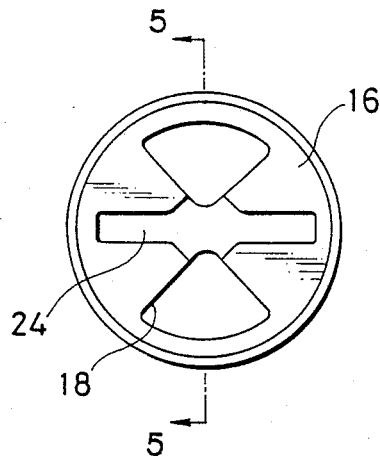
FIG. 3 is a plan view of the movable disk employed in the prior art shown in FIG. 2.
Figure 4:
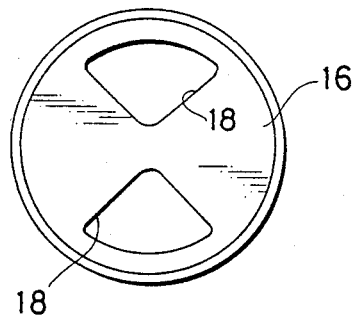
FIG. 4 is a bottom view of the movable disk.
Figure 5:
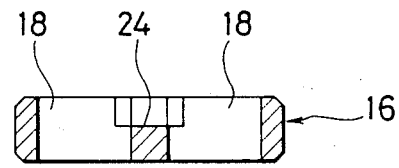
FIG. 5 is a sectional view taken along the line V—V of FIG. 3.
Figure 6:
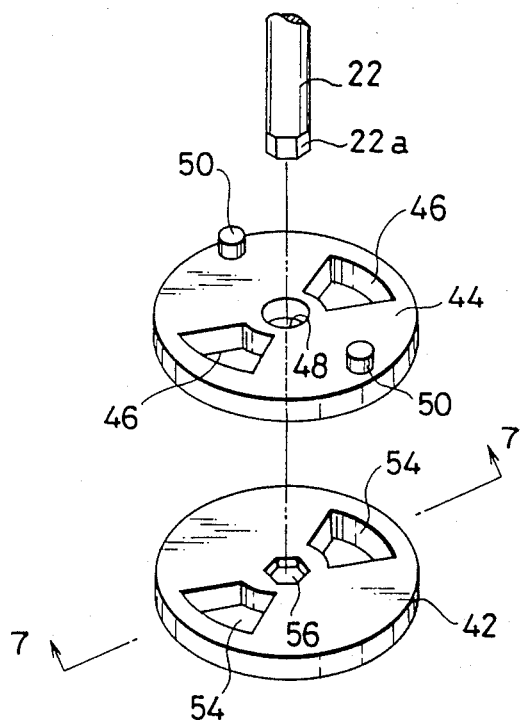
FIG. 6 is an exploded perspective view showing the arrangement of an essential part of the embodiment of the present invention.
Figure 7:
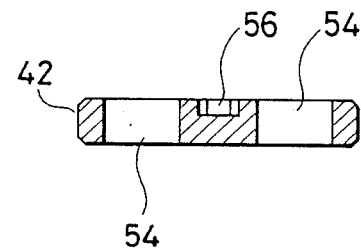
FIG. 7 is a sectional view taken along the line VII—VII of FIG. 6.

In a preferred embodiment of the disk type valve according to the present invention shown in FIGS. 1, 6 and 7, a movable disk 42 is disposed closer to the end B of the valve casing 12 than a fixed disk 44 in contrast to the prior art shown in FIG. 2. The arrangement of the movable and fixed disks 42 and 44 will first be explained with reference to FIGS. 6 and 7.

The fixed disk 44 is provided with two substantially sectorial openings 46 for passing water, and an insertion bore 48 for receiving the spindle 22 is provided in the center of the fixed disk 44. The fixed disk 44 has projections 50 which are provided on the reverse surface to the surface which is in sliding contact with the movable disk 42.

The projections 50 are engaged with respective recesses 52 provided in the valve casing 12, thereby locking the fixed disk 44 from rotating.

The movable disk 42 is provided with two substantially sectorial openings 54 for passing water, and a non-circular (hexagonal in this embodiment) recess 56 is formed in the center of the movable disk 42 so that the distal end of the spindle 22 is inserted into the recess 56. A non-circular (hexagonal in this embodiment) portion 22a which is fitted into the recess 56 is formed at the distal end of the spindle 22.

The movable and fixed disks 42 and 44 are disposed one on top of the other within the valve casing 12 in such a manner that the movable disk 42 is closer to the end B of the valve casing 12, as stated above. The movable and fixed disks 42 and 44 are prevented from falling by means of a suitable member, for example, a C-ring 58 which is engaged with the inner peripheral surface of the valve casing 12. Since the arrangement of the rest of the disk type valve 60 is the same as that in the prior art, the same members are denoted by the same reference numerals and description thereof is omitted.

In the disk type valve 60 having the above-described arrangement, if the movable disk 44 is rotated through the spindle 22 so that the respective openings 46 and 54 in the fixed and movable disks 44 and 42 overlap each other, water entering the valve 60 from the end B passes through the movable and fixed disks 42 and 44 in the mentioned order and flows out from the slit 14. If the movable disk 42 is rotated so that the openings 46 and 54 in the fixed and movable disks 44 and 42 do not overlap each other, the supply of water is cut off.

Thus, in this embodiment, the movable disk 42 slides while being pressed against the fixed disk 44 by the water pressure alone and there is no resistance occurring between the movable disk 42 and any other portion. More specifically, the water pressure causes sliding friction to occur between the fixed and movable disks 44 and 42, but the movable disk 42 is not subjected to the pressing force from a leaf spring which has heretofore been employed. In addition, since the movable disk 42 is not in sliding contact with a holder portion or a slip washer, there is no sliding friction which would otherwise be caused by these members. Accordingly, the sliding resistance to the movable disk 42 is considerably low, so that the torque required to rotate the movable disk 42 is extremely small.

Figure 8:
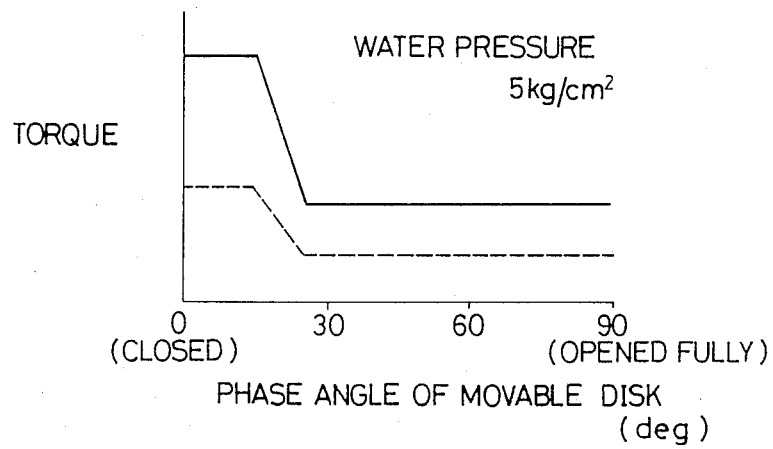
FIG. 8 is a graph showing the results of measurement.

FIG. 8 is a graph showing the results of measurement of the torque required to rotate the movable disk in the disk type valve according to the present invention . . . and in the disk type valve according to the prior art.- It will be clear from FIG. 8 that the torque required to rotate the movable disk in the present invention is extremely small.

Referring next to FIGS. 9 to 11, which show parts of another preferred embodiment of the present invention, a cross-shaped recess 56 into which the distal end of the spindle 22 is inserted is formed in the center of the movable disk 42. A cross-shaped portion 22a (see particularly FIG. 11) which is fitted into the recess 56 is formed at the distal end of the spindle 22.

Figure 13:
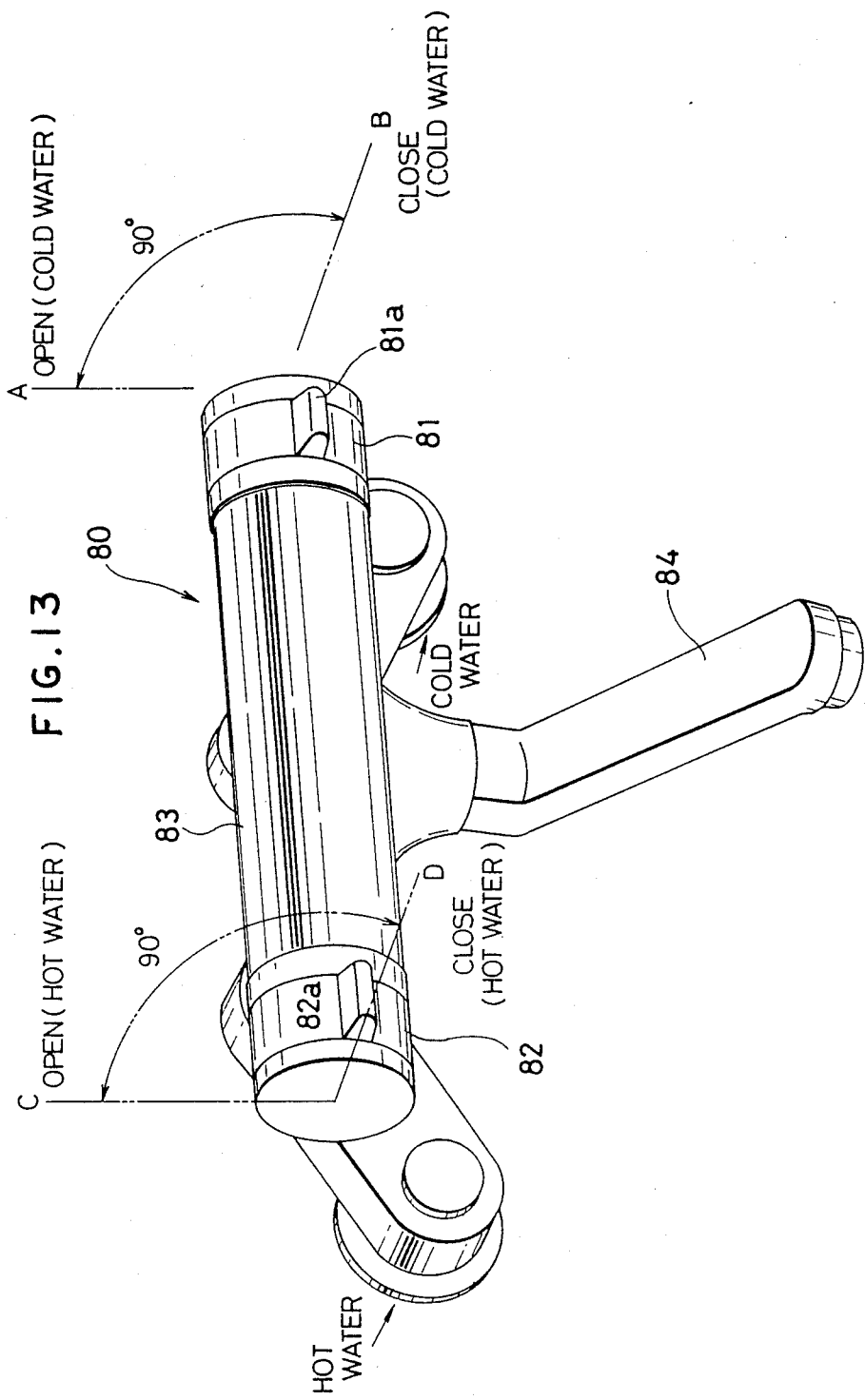
FIG. 13 is a perspective view of a two-handle type mixing valve.
Figure 14:
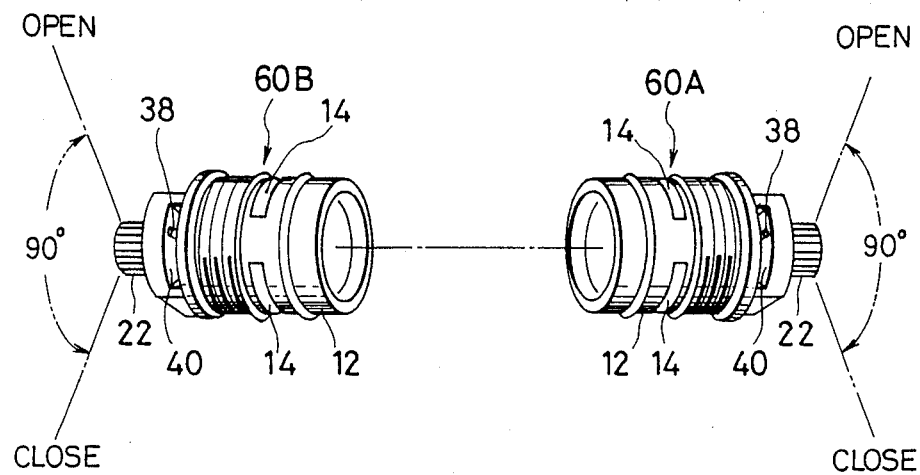
FIGS. 14 and 15 are perspective views each showing the arrangement of two disk type valves.

The disk type valve shown in FIGS. 9 to 11 is extremely suitable for use in a two-handle type mixing valve 80 shown in FIG. 13. In the mixing valve 80, a handle 81 for cold water and a handle 82 for hot water are disposed at two ends, respectively, of the body 83 and disk type valves 60A and 60B are installed inside the body 83, as shown in FIG. 14. If the handles 81 and 82 are turned so that projections 81a and 82a which are respectively provided thereon face upward (i.e., in the directions A and C, respectively), cold water and hot water are discharged from a nozzle 84, whereas, if the handles 81 and 82 are turned so that the respective projections 81a and 82 face forward (i.e., in the directions B and D, respectively), the supply of cold water and hot water is cut off.

Figure 15:
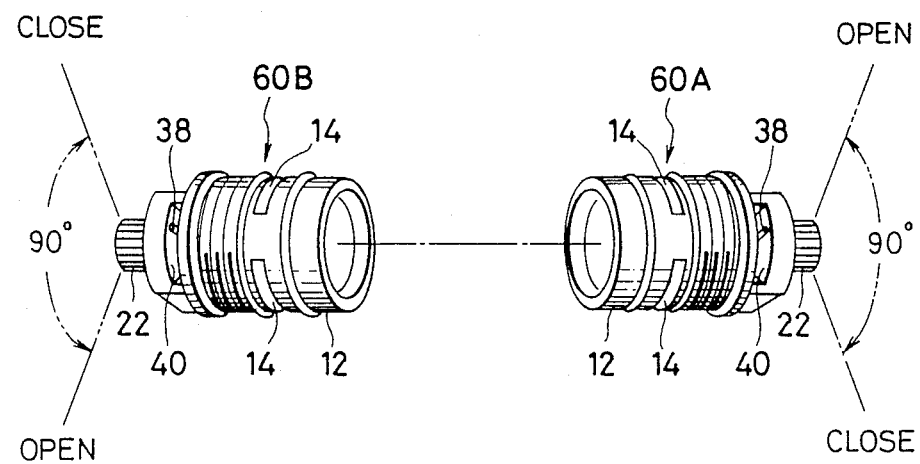

Incidentally, if the disk type valves 60A and 60B have the same arrangement, the disk type valve 60B operates inconveniently in such a manner that, when the handle projection 82a faces upward (i.e., in the direction C), the supply of water is cut off, whereas, when the handle projection 82a faces forward (i.e., in the direction D), water is discharged, as shown in FIG. 15.

In the present invention, however, the cross-shaped portion 22a is provided at the distal end of the spindle 22 and the recess 56 also has a cross-spaped configuration. It is therefore possible to connect together the movable disk 42 and the spindle 22 so that the movable disk 42 is 90° shifted circumferentially with respect to the axis of the spindle 22. Accordingly, it is possible to arrange the mixing valve 80 such that, when the projections 81a and 82a face upward (i.e., in the directions A and C, respectively), water is discharged, whereas, when the projections 81a and 82a face forward (i.e., in the directions B and D, respectively), the supply of water is cut off, as shown in FIG. 14.

Figure 12:
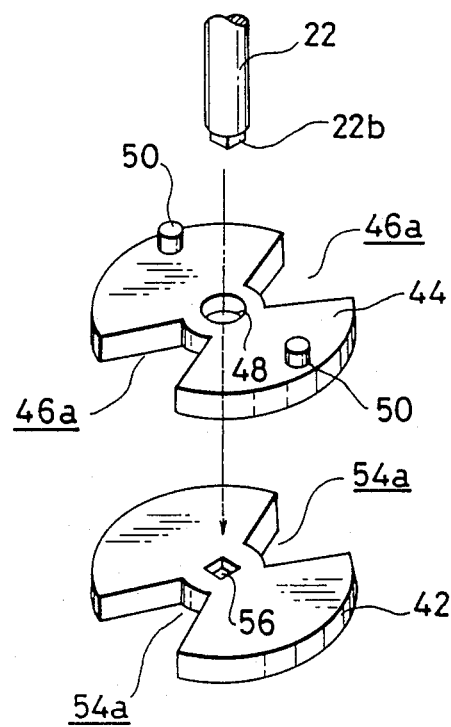
FIG. 12 is an exploded perspective view of still another embodiment of the present invention.

Although in the foregoing embodiment the disks 42 and 44 are provided with the respective openings 54 and 46, notches 54a and 46a may be provided in place of the openings, as shown in FIG. 12. In addition, it is also possible to provide a square portion 22b at the distal end of the spindle 22 in place of the cross-shaped portion 22a and a square recess 56 in place of the cross-shaped recess 56. However, if the distal end of the spindle 22 has a cross-shaped configuration, the play between the spindle 22 and the movable disk 42 is smaller than in the case where the square portion 22b is provided at the distal end of the spindle 22.

What is claimed is:

1. A disk type valve comprising:
    a cylindrical valve casing having an end portion and a side opening to allow fluid to pass from the end portion to the side opening,
    a fixed disk immovably situated inside the casing adjacent the side opening to orient perpendicular to a central axis of the casing, said fixed disk having a central hole and at least one opening,
    a movable disk rotationally situated inside the casing adjacent the fixed disk at a side of the end portion to orient parallel to the fixed disk, said movable disk having at least one opening and a cross-shaped recess in the center thereof,
    means for supporting the movable disk without pressing the movable disk, said supporting means being attached to the casing under the movable disk, and
    a spindle having a cross-shaped distal end, said spindle passing through the central hole of the fixed disk and engaging the cross-shaped recess of the movable disk so that when the opening of the movable disk communicates the opening of the fixed disk by turning the spindle, water flows from the end portion to the side opening through the openings of the fixed and movable disks.

2. A disk type valve according to claim 1, wherein said two disks are made of a ceramic material.

3. A disk type valve according to claim 2, wherein said ceramic material is alumina.

4. A disk type valve according to claim 1, wherein said spindle is rotated through 90° about its own axis to open or close said valve.

5. A disk type valve according to claim 1, wherein said means for supporting the movable disk is a ring attached to an inside of the casing.

6. A disk type valve according to claim 1, wherein said casing includes a flange with a plurality of recesses provided adjacent the side opening, and said fixed disk includes a plurality of projections, said projections engaging the recesses so that the fixed disk does not move relative to the casing.

* * * * *